Sept. 23, 1947.  G. R. MICUTA  2,427,684
NUT LOCK
Filed June 12, 1945
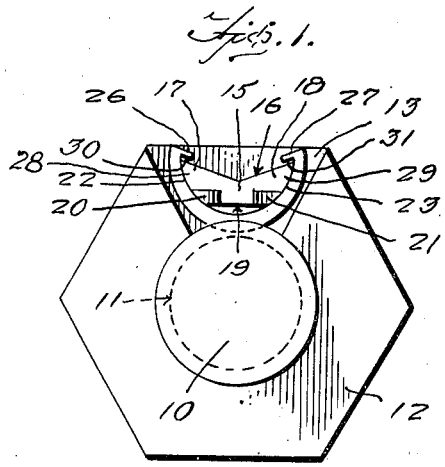
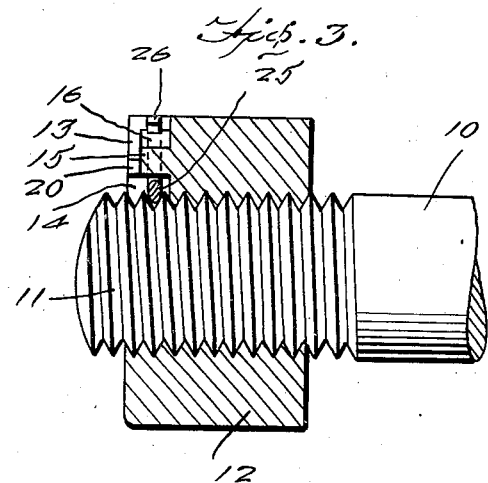
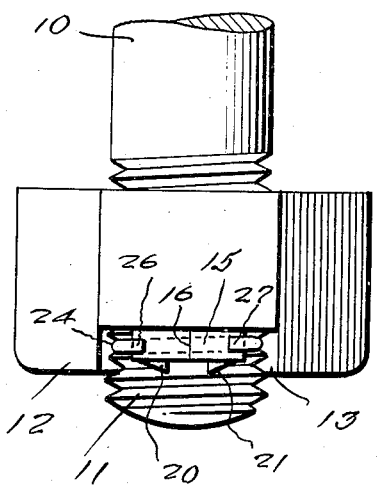
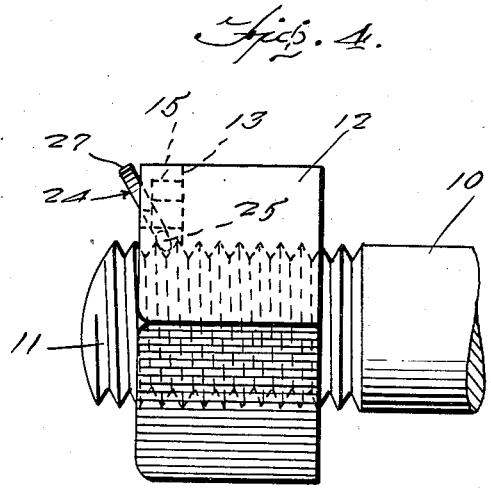
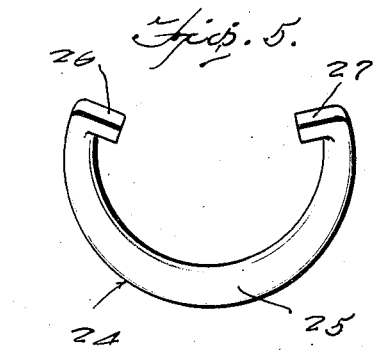
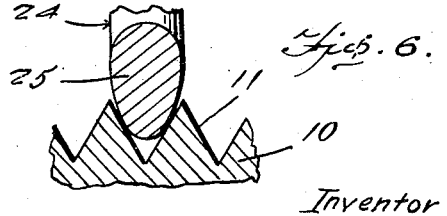
Inventor
George R. Micuta
Attorneys Patented Sept. 23, 1947

2,427,684

UNITED STATES PATENT OFFICE 2,427,684

NUT LOCK

George R. Micuta, Bridgeport, Conn.

Application June 12, 1945, Serial No. 598,948

3 Claims. (Cl. 151—25)

This invention relates to nut locks and has for one of its objects to improve generally upon devices of this character and to simplify the structure without detracting from the durability and practical efficiency of the same.

Another object is to provide for the application of the locking device without necessitating any material alteration in the structural form of the nut itself by the provision of a recess or seating portion for the application of the locking device to the nut without causing any undue weakening of the nut body.

Other objects and advantages to be attained will hereinafter more fully appear in the following description.

An illustrative but non-limiting embodiment of the invention is illustrated in the accompanying drawings, in which:

Figure 1 is a face plan view of a nut as applied to a screw threaded bolt or the like, with the locking device applied;

Figure 2 is a side elevational view of the parts shown in Figure 1;

Figure 3 is a view partly in longitudinal section of the nut and the portion of the bolt or the like to which the nut is applied shown in elevation;

Figure 4 is a side elevational view, similar to the showing in Figure 2, but illustrative of the manner in which the locking device is applied;

Figure 5 is a detail view of the locking device detached; and

Figure 6 is a fragmentary, sectional view, on an enlarged scale showing a cross sectional form of the locking device and the device as placed in locking position in engagement with the threads of the bolt or the like.

Referring now to the drawings in detail, the numeral 10 designates the plain cylindrical body portion of a conventional bolt or the like, the same having the screw threaded end portion 11. Placed on the screw threaded portion 11 of the bolt is a nut 12 of conventional form except as to provision thereon for the application of the locking device of the present invention.

In accordance with a practical adaptation of the present invention, the nut 12 is recessed on one end face and adjacent one side thereof, as at 13, said recessed portion, as shown, being flared towards and open at one side, the outer side, and tapering towards its inner open side which is open to communication with the screw threaded bore of the nut, as at 14, (see Figure 3).

The bottom of the recess 13 is generally flat throughout the entire extent thereof, except, at the middle thereof, there is formed an upstanding lug 15 which is formed reentrantly at its outer side, as at 16, producing oppositely winged portions 17, 18. The inner wall face of the lug 15 is straight and flattened, as at 19. Provided coincidently with the straight inner wall 19 of the lug 15, a pair of opposed upstanding cam spreader lugs 20, 21 having oppositely inclined top faces are formed on the top face of the lug 15. These cam spreader lugs 20, 21 are spaced apart and their outer lower ends merge with rounded end face portions 22, 23, respectively, of the lug 15.

The locking element proper 24, as illustrated more clearly in Figure 5, is of a semicircular or substantially crescent shaped form and the same is made of metal possessing substantial inherent resiliency whereby the same is form-retentive and reactive with a tendency to assume its original form after it has been expanded or deformed when it is applied in use as will be presently more fully described. Preferably, but without absolute limitation, the middle portion 25 of the element 24 is the thickest or heaviest and the same tapers towards its opposite ends which are turned inwardly to provide lug extensions 26, 27. As shown, these lug extensions 26, 27 are placed at convergent angles with relation to each other so that, when the element 24 is applied in locking position on the nut, said end portions 26, 27 are located in hooked relation to the adjacent sharpened corner portions 28, 29 of the oppositely disposed wing portions 17, 18 of the lug 15.

In applying the lock element 24 to the nut 12 it is first placed in the recess 13 of the nut substantially at an inclination as indicated in Figure 4, with its middle curved portion 25 downward between the straight inner face 19 of the lug 15 and the adjacent screw threaded portion 11 of the bolt on which the nut 12 has been previously positioned. The element 24 being thus initially placed, its outer opposite free end portions are forced downwardly, the two opposite intermediate portions between its free ends and its engaged middle portion being expanded as the same are forced down over the inclined top faces of the cam spreader lugs 20, 21, whereupon the opposite end portions of the element 24 are made to ride in contact with the curved opposite end faces 22, 23 of the lug 15, at which time the end lugs 26, 27 of the element 24 are in hooked relation to the sharpened corner portions 28, 29 of the lug 15, as indicated more clearly in Figure 1. It is here noted, that the size of the lock element proper 24 is proportioned so that, when the device is applied, as indicated in Figure 1, there are appreciable clearance spaces 30, 31 between the inner faces of the lugs 26, 27 and the adjacent corner portions of the reentrant wall 16 of the lug 15. With this particular provision, the locking element 24 is readily forced into position on the nut 12 without any interference which might be otherwise caused by contact or binding of the lug portions 26, 27 on the corner portions of the lug 15.

Obviously, while the locking element 24 of the present invention is readily forced into place as it is applied to the nut 12 in locking relation to the threaded end portion 11 of the bolt 10, it is clearly apparent that the element 24 may be as readily forced out of working position at the will of the operator by the use of a simple form of prying tool such as a screw driver bit or the like.

The effective middle portion of the locking element 24 may be of any desirable cross section for an intimate substantially wedging engagement with the threaded portion of the bolt. A practical cross sectional form of this locking element 24 is illustrated on an enlarged and more or less schematic scale in Figure 6. In this illustration, it is noted that the middle body portion of the element 24 is of a cross section which is oval and with its narrower end portion disposed peripherally outward, the size of the smaller end portion of the element 24 being, of course, such that the same enters rather deeply in the valley between the threads.

While the illustrated cross sectional formation of the body portion of the element 24 is practical and ideal for the purposes intended, it is to be understood that the same admits of considerable change and modification and also that changes in the precise form of the recess 13 and lug 15 in the nut are contemplated within the purview of the invention as defined in the appended claims. The invention, therefore, is not limited to the particular construction and arrangement shown.

Having thus described the invention, what is claimed is:

1. A means for locking nuts in place on screw threaded bolts and the like, wherein the nut is provided with a recess in its end face and open to communication at its inner side with the screw threaded bore of the nut, said recess of the nut having retainer provision including opposed wing portions therein, and a spring locking element having a definite normal form, said locking element being insertable in the recess of the nut and having a portion arranged and adapted to holdingly engage the adjacent threaded portion of the bolt on which the nut is placed and being spreadable under tension into engaging and holding relation to the opposed wing portions of said retainer provision in the recess of the nut.

2. Means for locking a nut on the screw threaded portion of a bolt or the like, wherein the nut is provided in its end face with a recess open at its inner side in communication with the bore of the nut, said recess having an upstanding lug substantially centrally thereof with clearance space therearound inside the recess of the nut, and a substantially crescent shaped locking element placeable in said recess with its intermediate portion in engagement with the threaded portion of the bolt or the like, and said element being spread about said centrally disposed upstanding lug in the nut recess and held in engagement therewith.

3. Means for locking a nut on the screw threaded portion of a bolt or the like, wherein the nut is provided in an end face with a recess which is flared and open towards its outer side and tapered towards its inner side and there opened into communication with the bore of the nut, an upstanding lug formed centrally on the bottom of said nut recess with a clearance space theraround, the inner wall face of said lug being straight and flattened and its outer wall being formed reentrantly and thus providing oppositely flared wing extensions at opposite sides thereof, said central lug having on its top face a pair of oppositely disposed and effective cam spreader lugs formed coincidently with the flattened inner side wall of the central lug and inclining downwardly towards their outer ends which merge with rounded end portions of the central lug, and a substantially crescent shaped locking element having inturned angular lugs at its opposite ends, said element being insertable in the recess of the nut with its intermediate portion located between the central lug of the recess and the adjacent screw threaded portion of the bolt on which the nut is placed, said locking element being initially placed at an incline with its middle portion downward and its opposite outer end portions then forced into engagement with the opposed cam spreader lugs on said central lug of the nut recess whereby said end portions of the locking element are spread into engagement with the opposite wing portions of the central lug and in the position of the finally placed locking element the same by its reactive effect is self-holding in place.

GEORGE R. MICUTA.

REFERENCES CITED

The following references are of record in the file of this patent:

UNITED STATES PATENTS

| Number | Name | Date |
|---|---|---|
| 2,386,307 | Giles | Oct. 9, 1945 |